Sept. 19, 1967  W. J. KNOCHEL ET AL  3,341,915

METHOD OF MANUFACTURING ELECTROLUMINESCENT LAMPS

Filed Feb. 19, 1963

INVENTORS.
WILLIAM J. KNOCHEL AND
ROBERT W. WOLLENTIN.
BY
*D. S. Buleza*
AGENT.

United States Patent Office 3,341,915
Patented Sept. 19, 1967

3,341,915
METHOD OF MANUFACTURING ELECTROLUMINESCENT LAMPS
William J. Knochel, West Orange, and Robert W. Wollentin, Bloomfield, N.J., assignors to Westinghouse Electric Corporation, Pittsburgh, Pa., a corporation of Pennsylvania
Filed Feb. 19, 1963, Ser. No. 259,540
3 Claims. (Cl. 29—25.11)

This invention relates to electroluminescent devices and has particular reference to a method for fabricating flexible electroluminescent lamps.

Flexible electroluminescent lamps are well known in the art and offer distinct advantages over conventional lamps having a rigid glass or metal base member. In addition to being light in weight and unbreakable, such flexible lamps can be very readily cut or bent into a wide variety of forms. Thus, flexible electroluminescent lamps can be employed in many applications where complex shapes and designs are required and the use of rigid lamps would entail too great an expense.

While such flexible electroluminescent lamps are advantageous from a structural standpoint, they are relatively expensive to manufacture and present a quality control problem in that it is difficult to form the thin laminated cell structure and maintain the uniformity of thickness of the respective layers necessary to obtain optimum and uniform brightness when the lamp is energized.

It is accordingly the general object of the present invention to provide an improved method for manufacturing a flexible electroluminescent lamp that alleviates the aforesaid quality control problem and provides a device that has a uniform light output when it is energized.

The foregoing object and other advantages that will become apparent as the description proceeds are achieved in accordance with the present invention by depositing the various layers that comprise the electrode and light-generating portions of the flexible electroluminescent lamp on a temporary rigid substrate, and then stripping or peeling the laminated cell structure from the substrate. More specifically, the first layer that is deposited on the substrate is a layer of copper iodide that serves as the light-transmitting electrode and does not adhere well to the substrate, which is made from a suitable plastic such as polyacrylates, polystyrenes, cellulose acetate, polyvinyl chloride and the like. A layer of a suitable plastic dielectric containing the electroluminescent phosphor is then deposited on the copper iodide layer by spraying or rolling techniques so that a phosphor-impregnated dielectric layer of predetermined and uniform thickness is obtained. After a light-reflecting back electrode is applied, the cell is stripped from the rigid substrate, suitable lead wires are attached to the electrodes and the entire unit is encased in a protective envelope of a suitable plastic to protect it from the atmosphere.

A better understanding of the invention will be obtained by referring to the accompanying drawing, wherein.

Figure 3:
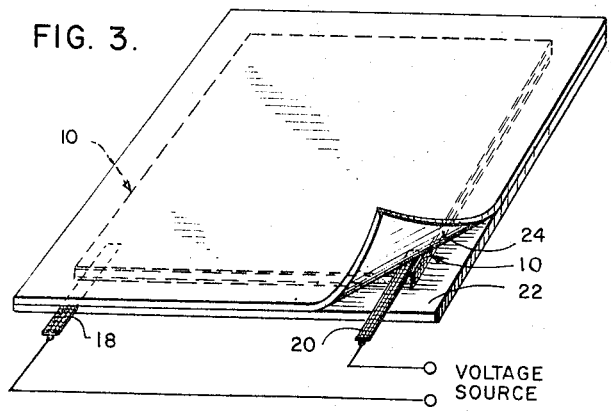
Figure 4:
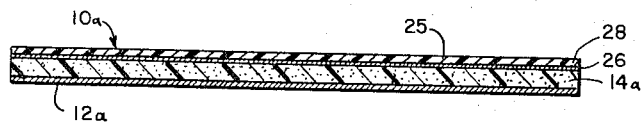

FIGURE 3 is a similar view of a completed lamp assembly wherein the electroluminescent cell is sealed between two sheets of high density plastic material; and FIGURE 4 is an enlarged cross-sectional view of an alternative cell structure wherein a layer of metallized plastic is bonded to one side of the cell structure to serve both as the light-reflecting back electrode and a protective coating or film.

While the present invention may be used with advantage in fabricating various types of electroluminescent devices, it is particularly adapted for use in connection with the manufacture of flexible electroluminescent lamps and has accordingly been so illustrated and will be so described.

The flexible electroluminescent lamp produced by the present invention basically comprises a layer of a suitable plastic dielectric such as polyvinyl chloride-acetate or the like that is impregnated with finely-divided electroluminescent phosphor particles and sandwiched between two flexible electrodes at least one of which is light-transmitting. The electroluminescent lamp is, accordingly, of "all plastic" construction and the laminations or various layers are made of such thickness and are so securely bonded to one another, that the lamp can be flexed without cracking or otherwise becoming damaged.

Figure 1:
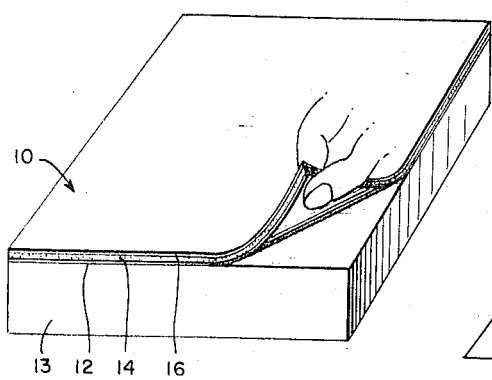
FIGURE 1 is a perspective view illustrating the manner in which the laminated flexible electroluminescent cell component is stripped from the temporary rigid support member in accordance with the present invention.

As shown in FIGURE 1, the flexible electroluminescent cell 10 is fabricated by depositing a layer 12 of a light-transmitting electrically-conductive material such as copper iodide on a temporary supporting member or substrate 13 that does not adhere well to the copper iodide layer. Substrates of polyacrylate and similar plastics having like properties have given satisfactory results in that the copper iodide layer can be readily separated from the substrate enabling the completed cell 10 to be stripped from the support without difficulty. A layer of phosphor-impregnated plastic dielectric 14 is then deposited over the light-transmitting electrode 12 and is, in turn, covered by a second electrode 16 such as a thin light-reflecting layer of aluminum. The phosphor-impregnated plastic layer 14 is deposited while the plastic is in a liquid state. Any suitable hardenable plastic such as polyvinyl chloride-acetate can be used as the dielectric embedding matrix. Polymerizable plastics such as epoxy, cross-linked acrylics, styrene, polyesters and the like can also be used.

After the phosphor-impregnated plastic layer 14 has cured and becomes securely bonded to the electrode 12 and the aluminum back electrode 16 has been applied, the cell structure 10 is peeled from the substrate 13, preferably by gripping one corner of the cell and pulling it back toward the diagonally-opposite corner of the substrate, as shown in FIGURE 1.

The light-transmitting electrode 12 and the phosphor-dielectric layer 14 can be deposited by various means known to the art so that they can be made to a predetermined and uniform thickness. It is important that the thickness of the various layers which form the cell structure be such that the lamp is sufficiently flexible and able to withstand the operating voltage without breaking down. As a specific example, in the case of a lamp designed to operate from a 120 volt A.C. power supply the copper iodide layer 12 is preferably about 200 to 2000 A. thick, the phosphor-dielectric layer 14 about 0.5 to 1.5 mils thick, and the aluminum electrode 16 about 1000 to 2500 A. thick.

Figure 2:
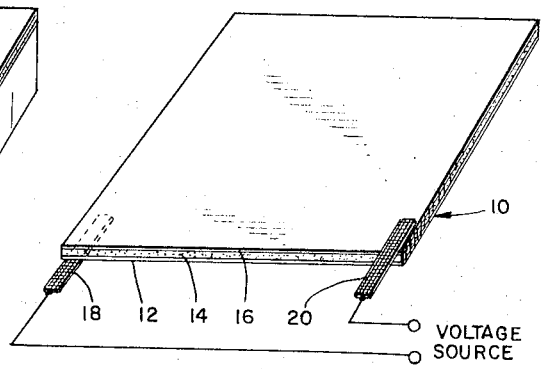
FIGURE 2 is a perspective view of the laminated cell with lead wires attached.

Electrical connection with the stripped flexible electroluminescent cell 10 is effected according to the illustrated embodiment by attaching suitable terminals such as strips 18 and 20 of copper wire mesh to the electrodes 12 and 16, respectively, as shown in FIGURE 2, and attaching lead-in conductors to the projecting ends of the terminals. These strips can be anchored to the electrodes by means of conducting epoxy or cements and by utilizing pressure contacts well-known in the art. These terminals can also be anchored between the respective electrodes and the phosphor-dielectric layer 14 by placing one of them over the light-transmitting electrode 12 and the other over the phosphor-dielectric layer before the metal electrode 16 is deposited, thus automatically incorporating them as integral parts of the electroluminescent cell structure during its fabrication.

Since electroluminescent phosphor is moisture sensitive it is necessary to protect the electroluminescent cell 10 from the atmosphere. This can readily be accomplished, as shown in FIGURE 3, by placing the cell 10 between two sheets 22 and 24 of a suitable moisture-impervious plastic such as high-density polyethylene, fluorocarbons, polyesters, and the like approximately 2 to 7 mils thick. The dimensions of the plastic sheets 22 and 24 are larger than those of the cell 10 and their overlapping edges are heat sealed so that the terminals 18 and 20 are hermetically sealed through the protective envelope formed by the joined plastic sheets.

As shown in FIGURE 4, the functions of a light-reflecting electrode and a protective plastic layer can be met by a single sheet of a suitable densely-metallized plastic film 25. This film can comprise a sheet of cellulose acetate having a dense reflecting layer or foil of nickel 26 (or other suitable metal such as aluminum) bonded to one face and to the phosphor-plastic layer 14a of the electroluminescent cell 10a. Such metallized plastic films are well known in the art. As shown, the metal layer 26 faces and is bonded to the phosphor-dielectric layer 14a and, in conjunction with the other electrode of copper iodide, 12a permits an energizing potential to be applied to the embedded phosphor particles in the usual manner. The metallized plastic film 25 is placed over the phosphor-plastic layer 14a while the latter is still in the liquid phase so that it will become bonded to this layer when the plastic cures thereby providing one of the electrodes and also covering one side of the cell with a protective plastic layer.

It will be appreciated from the foregoing that the objects of the invention have been achieved insofar as a novel method for making a flexible electroluminescent lamp has been provided which enables the thickness of the various layers to be carefully controlled and permits laminated cell structures to be quickly fabricated at minimum cost.

While one embodiment has been illustrated and described in detail, various changes can be made without departing from the spirit and scope of the invention.

We claim as our invention:
1. The method of making a laminated electroluminescent panel that is flexible and self-supporting, which method comprises,
    deposit-forming a layer of copper iodide in situ on and in direct contact with a rigid temporary support member that is composed of a material to which copper iodide only loosely adheres,
    applying in the liquid phase a layer of phosphor-impregnated hardenable plastic dielectric material on said copper iodide layer,
    depositing a thin film of metal on said phosphor-impregnated plastic layer,
    allowing the phosphor-impregnated plastic layer to cure and thus form with said copper iodide layer and metal film a self-supporting laminated electroluminescent cell,
    and then stripping said laminated electroluminescent cell from said rigid support member.

2. The method of making a laminated electroluminescent panel that is flexible and selfsupporting, which method comprises,
    deposit-forming a layer of copper iodide in situ on and in direct contact with a temporary rigid support member composed of a preselected plastic material to which copper iodide only loosely adheres,
    spraying a layer of phosphor-impregnated hardenable plastic dielectric material on said copper iodide layer,
    vapor depositing a thin film of metal on said phosphor-impregnated plastic layer,
    allowing the phosphor-impregnated layer to cure and thus become bonded to said copper iodide layer and metal film and form therewith a self-supporting laminated electroluminescent cell, and then
    stripping said laminated electroluminescent cell from said temporary rigid support member.

3. The method of making a flexible electroluminescent panel comprising,
    deposit-forming a layer of electrically-conductive light-transmitting material in situ on and in direct contact with a rigid temporary support member that has a surface to which the layer of light-transmitting material only loosely adheres,
    deposit-forming a layer of admixed electroluminescent phosphor particles and a hardenable plastic dielectric material on said layer of light-transmitting conductive material,
    covering said phosphor-dielectric layer with a thin film of metal,
    curing said hardenable plastic dielectric so that the respective layers are bonded one to the other, and then
    stripping the resulting electroluminescent lamination from said rigid support member.

References Cited
UNITED STATES PATENTS

| | | | |
|---|---|---|---|
| 2,237,328 | 4/1941 | Birdseye et al. | 117—211 |
| 2,243,108 | 5/1941 | Lubszynski et al. | 117—211 |
| 2,728,870 | 12/1955 | Gungle | 313—108 |
| 2,756,165 | 7/1956 | Lyon | 117—211 |
| 3,075,118 | 1/1963 | Thornton | 313—108 |
| 3,121,817 | 2/1964 | Saviers | 313—108 |
| 3,133,221 | 5/1964 | Knochel et al. | 313—108 |
| 3,172,773 | 3/1965 | Blazek | 117—217 X |
| 3,252,845 | 5/1966 | Schindler | 156—67 |

WILLIAM I. BROOKS, *Primary Examiner.*

GEORGE N. WESTBY, *Examiner.*

D. E. SRAGOW, *Assistant Examiner.*